Aug. 15, 1933.  N. A. CARTER  1,922,027
TRAILER BODY
Filed Aug. 15, 1931  5 Sheets-Sheet 1
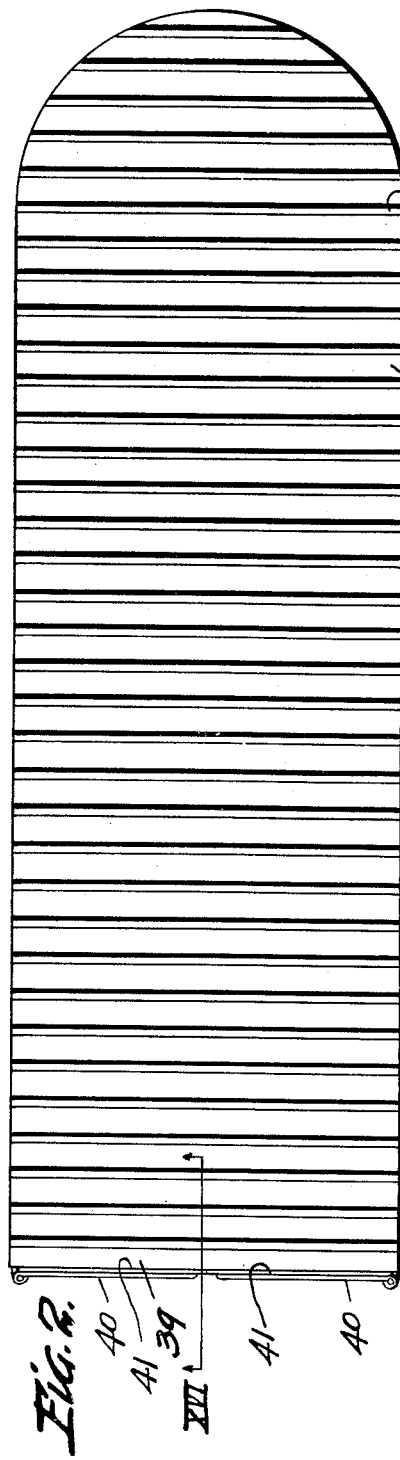
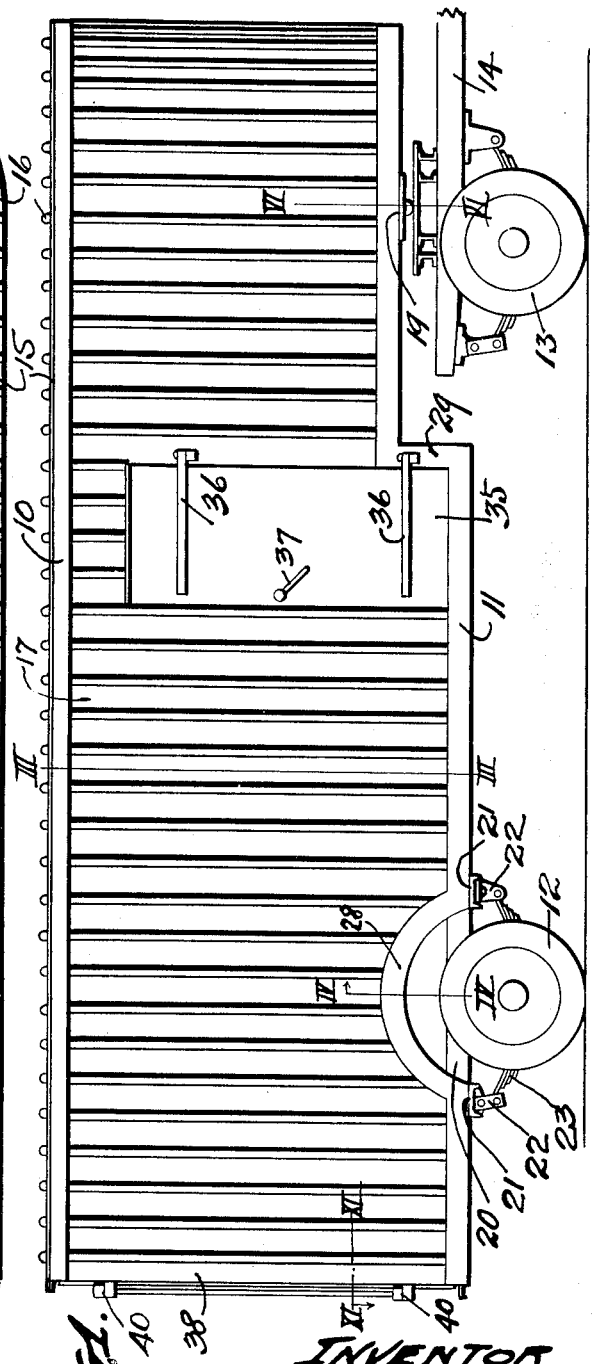

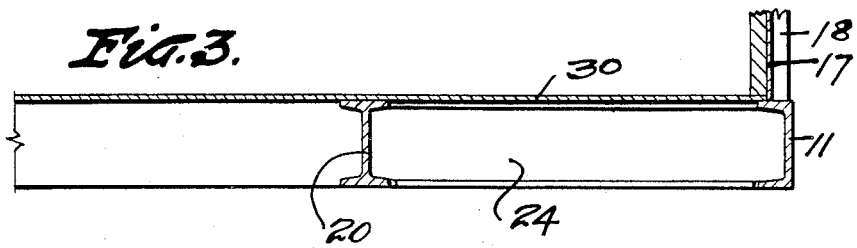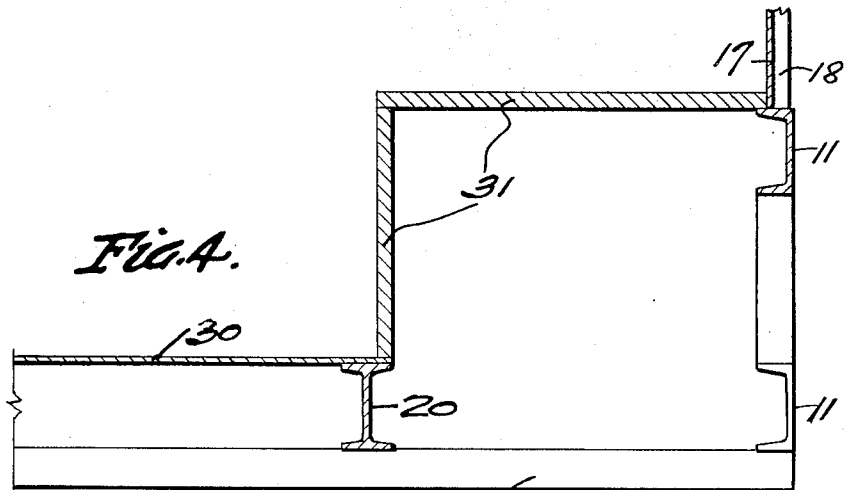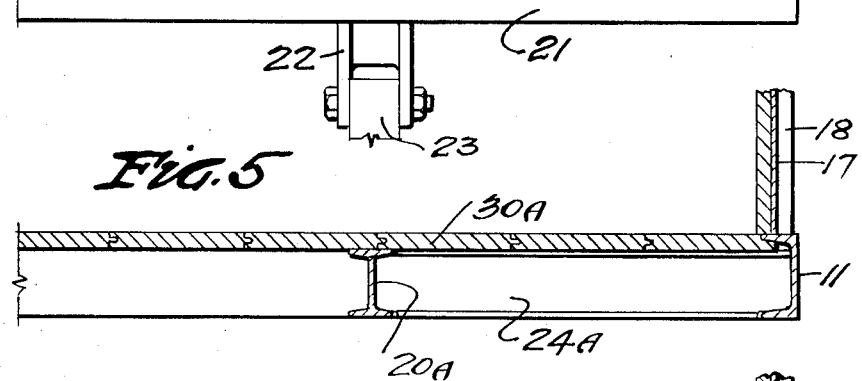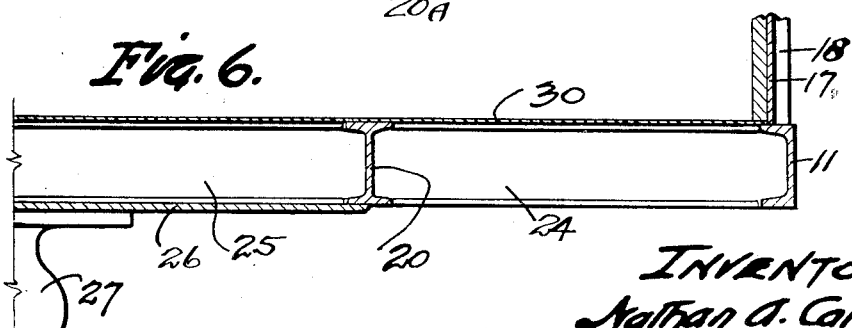

Aug. 15, 1933.　　　　　N. A. CARTER　　　　　1,922,027
TRAILER BODY
Filed Aug. 15, 1931　　　5 Sheets-Sheet 3
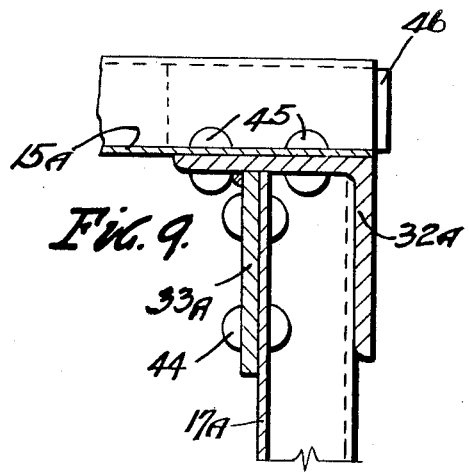
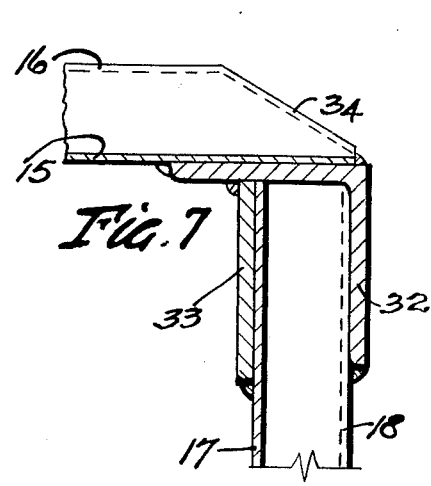
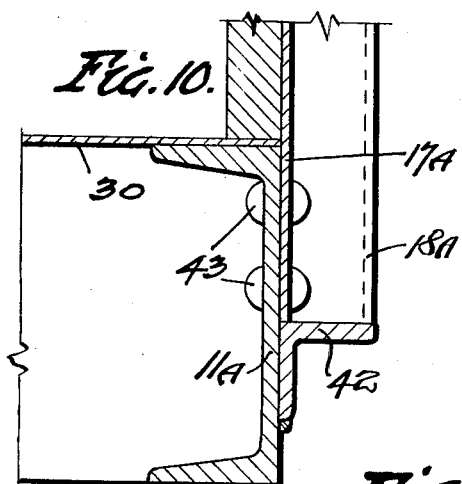
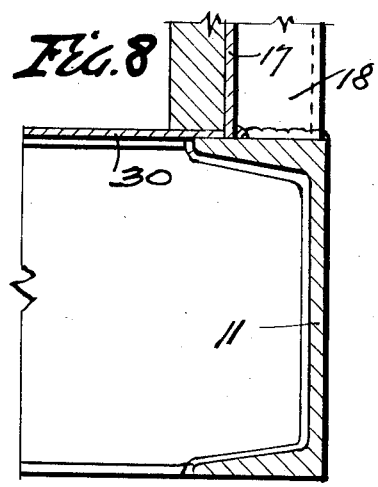
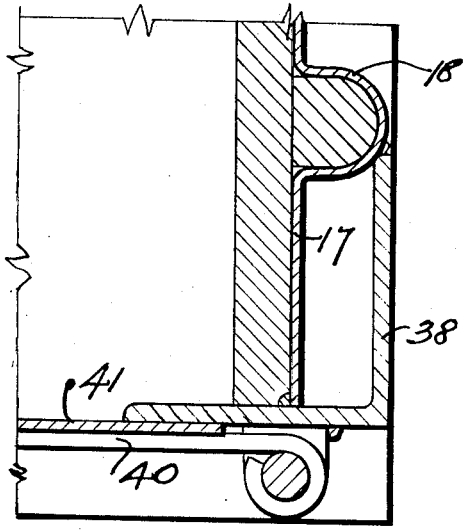
INVENTOR
Nathan A. Carter
by J. H. Weatherford
atty.

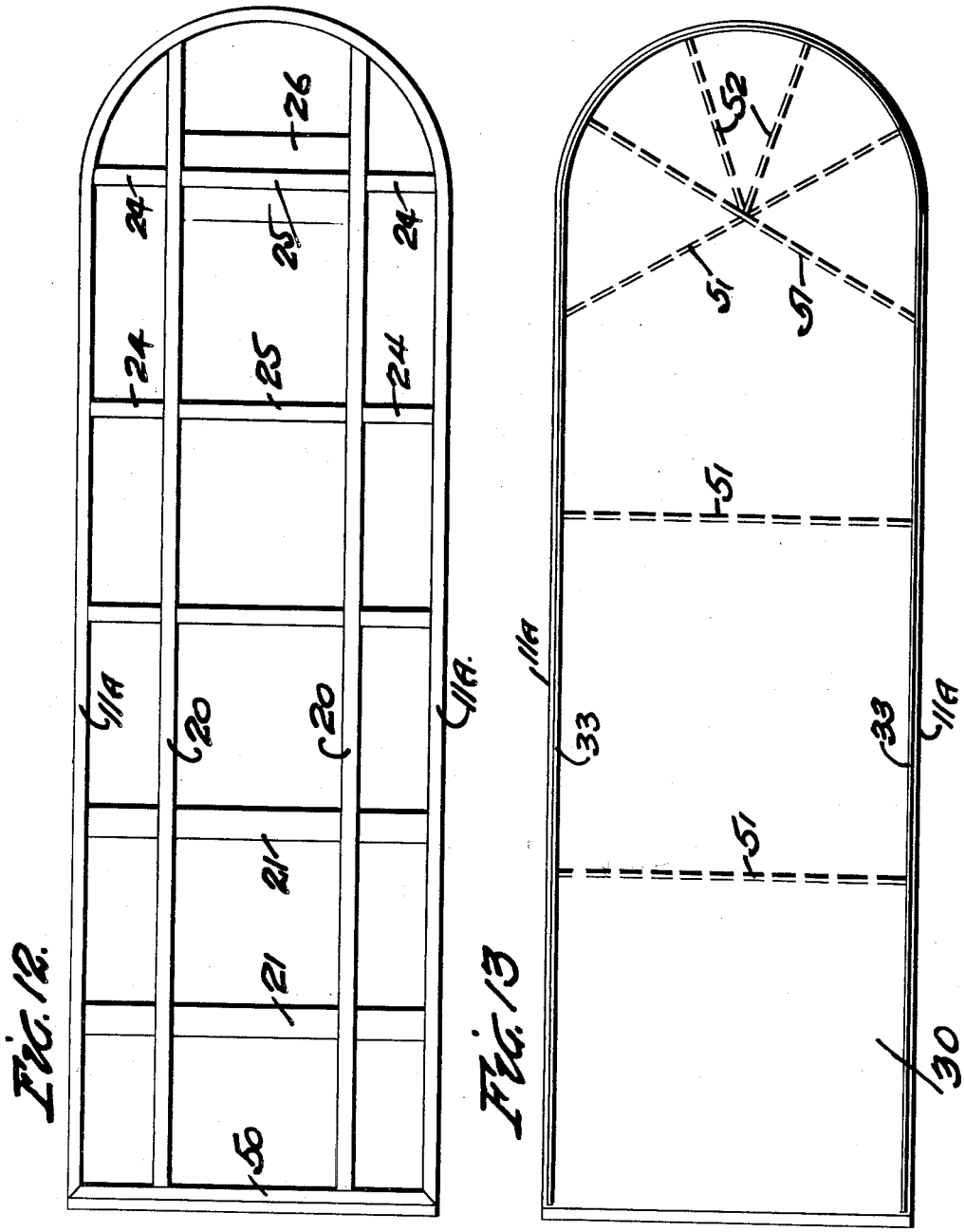

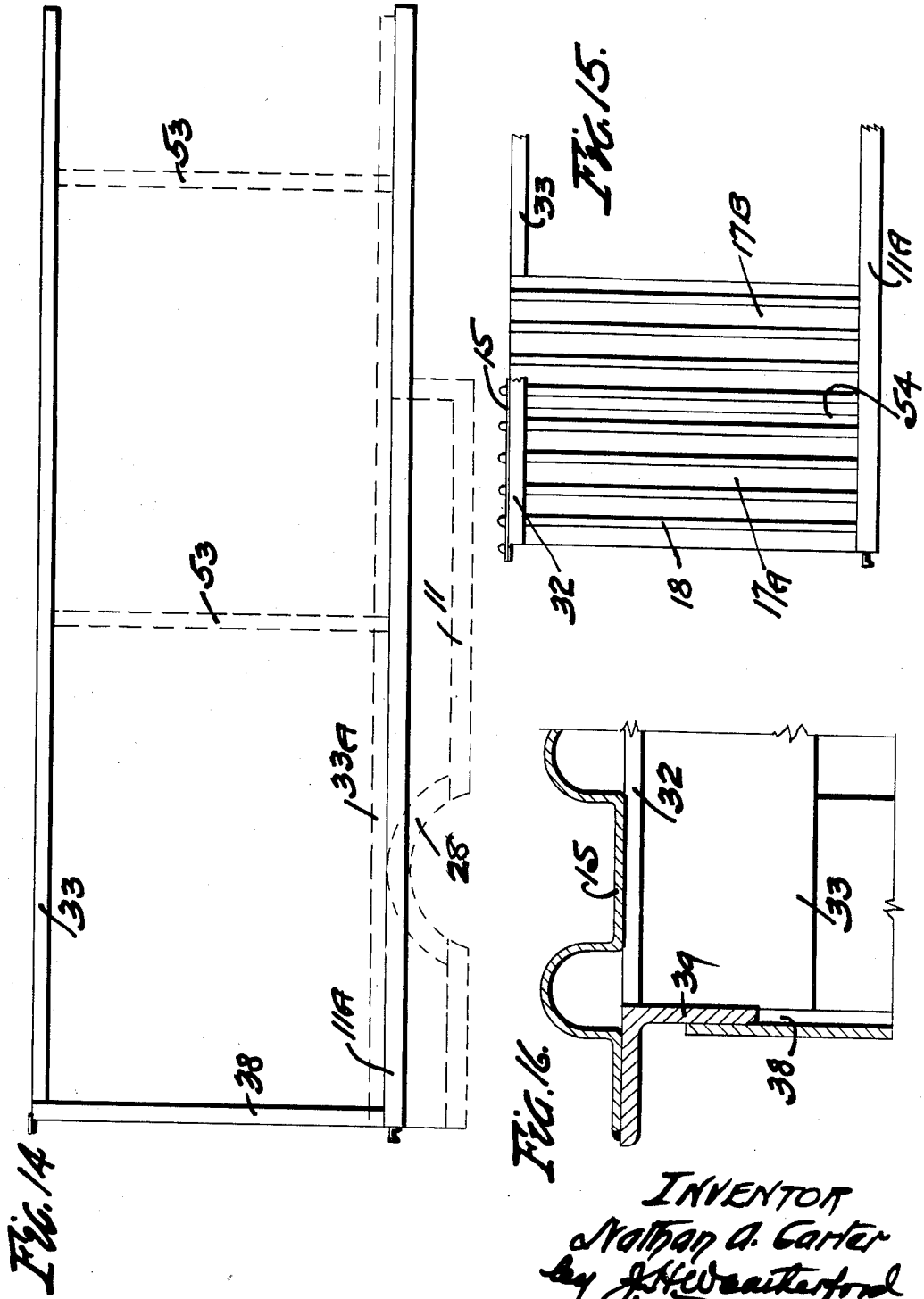

Patented Aug. 15, 1933

1,922,027

UNITED STATES PATENT OFFICE 1,922,027

TRAILER BODY

Nathan A. Carter, Memphis, Tenn.

Application August 15, 1931. Serial No. 557,219

5 Claims. (Cl. 296—28)

This invention relates to improvements in bodies for trailers, especially adapted for use with automobile trucks and has especial relation to a trailer body of large capacity, comparatively light in weight and of simple construction.

The objects of the device are to provide a trailer body which can be constructed with a minimum of parts and maximum strength for the materials used and in which a maximum amount of available space relative to the dimensions thereof is attained.

To provide improved details of construction therefor; and to provide improved methods of constructing the body. The means by which the foregoing and other objects are accomplished and the manner of their accomplishment will readily be understood from the following specification on reference to the accompanying drawings, in which:

Fig. 1 is a side elevation of a trailer showing a fragmentary part of an auto truck supporting the front end thereof.

Fig. 2 is a plan view of the trailer body.

Fig. 3 is an enlarged fragmentary section on the line III—III of Fig. 1 showing a portion of the bottom and side frame construction.

Fig. 4 is a similar fragmentary section taken as on the line IV—IV of Fig. 1.

Fig. 5 is a fragmentary section identical with that shown in Fig. 3 except that a wooden floor is used instead of the metal floor shown in Fig. 3.

Fig. 6 is a fragmentary section on the line VI—VI of Fig. 1, each of sections 3 to 6 inclusive showing half the width of the trailer only.

Fig. 7 is a fragmentary section on a still larger scale taken as on the line III—III of Fig. 1, showing the detail of the side wall and roof connections.

Fig. 8 is a fragmentary section taken on the same line showing the detail of the floor and side wall connections to the frame member.

Figs. 9 and 10 are fragmentary details corresponding to Figs. 7 and 8 respectively, showing the construction where the roof and side walls are of a material such as aluminum which does not lend itself to welding.

Fig. 11 is a similarly enlarged fragmentary section taken as on the line XI—XI of Fig. 1, showing the rear frame and hinge construction.

Fig. 12 is a plan of the main or bottom frame of the body.

Fig. 13 is a similar plan with the floor in place, and top template shaped and lying thereon ready to raise, preparatory to attaching the sides and front end.

Fig. 14 is a side elevation of the bottom frame, with rear end posts erected and top template raised and positioned to receive sides, initial position of the template being shown in dash lines.

Fig. 15 is a fragmentary side elevation showing two sections of siding erected and fragmentary portions of the top frame and top as they are subsequently put on.

Fig. 16 is an enlarged fragmentary section of the top taken on the line XVI of Fig. 12.

Referring now to the drawings in which the various parts are indicated by numerals, the trailer comprises a top or roof frame substantially U shape in plan and made up of parallel side angles 10, which are connected at their front ends by an integral substantially semicircular part, and a similarly shaped bottom, or floor frame which comprises parallel side channels 11 connected also at their front ends by an identically curved integral part. This bottom frame may be flat as shown in Fig. 14, or as shown in Fig. 1, may be arched over the trailer wheels 12, and stepped up at the front end over the truck wheels 13, and truck frame 14.

The specification initially, will be directed to Figures 1 to 11 inclusive. Directly secured to the top frame 10, is a roof 15, of thin metal which roof is provided with transverse U shaped ribs, or corrugations 16, formed directly in the metal and preferably uniformly spaced. The top and bottom frames are similarly connected by walls 17 of similar thin metal having similar ribs 18. The preferred shape of the ribs 16 and 18, are shown by the ribs 18 of Fig. 11. The front end of the trailer is pivotally supported at 19 on the rear of the truck and is substantially half of a vertical cylinder which has its axis passing through the pivot point.

The floor system one-half of which is shown in Figs. 3, 4, 5 and 6 comprises the lower frame channels 11, and two longitudinal girders 20 extending from front to rear. These members lie between the trailer wheels, and as indicated in Fig. 1, extend through along side of these wheels instead of being arched thereover, as are the side channels. At their front ends however, they are stepped up in identical fashion with the side channels. Transverse beams 21 extend across from outside channel to outside channel and carry brackets 22 with which the ends of the springs 23 are engaged. 24 are short cantilever beams which are secured to and extend outward from the girders 20 to the side channels 11.

Two of these cantilever beams extend outward substantially in line with the pivot point 19 and a similar beam 25 extends between the two girders 20 at this point. Disposed under this beam 25 is a transverse plate 26 to which is secured a coupling ball forming part of the pivot. All of these members are securely fastened together, this preferably being accomplished by electrical welding so that the parts thus secured, form in effect a single piece of material. The side channels 11 are arched over the wheels, this may be done by bending the channel to such form, or by stopping the channels adjacent the front and rear of the wheels and directly welding a suitably curved piece 28 to the tops of the channels. Similarly these channels may be bent upward to form the step up at the forward end of the trailer or short pieces 29 set vertically may be welded in to accomplish the same purpose. The floor 30 is preferably of sheet metal and if so is welded directly to the top of the girders 20 and of the side channels 11 and secures all of the parts of the floor frame rigidly together. The floor is cut away as shown in Fig. 4, where the trailer wheels come and the opening is preferably boxed up with wooden floor and side members 31. It extends continuously forward to the offset members 29 and is again continuous from this point to the front end of the trailer. The floor is preferably set back from the outer edge of the channels 11 a sufficient amount to permit the ribbed sides 17 to be seated solidly on top of the side frames 11, and these sides are welded both to the floor and to the side channels. At the top of the sides, an angle iron 32 is placed with one leg extending vertically downward along the outside of the ribs 18 and the other leg extending horizontally inward across the top of these ribs.

This angle iron preferably is a continuous piece bent to conform to the plan of the trailer. A flat bar of iron 33 is disposed against the inside of the side wall and is welded to the angle iron 32 and to the side wall. The angle iron and flat bar form a deep channel shaped closure for the upper ends of the corrugations or ribs of the sides, and the side channels 11 similarly form a closure for the bottom ends thereof. The roof 15 is laid flat on the horizontal leg of the angle iron 32 and the flat portion thereof is welded to the angle iron. Preferably the end of each corrugation is split and bent down to form an inclined portion 34 which is welded together to form a closed end corrugation. The roof thus welded to the top frame, braces and gives lateral rigidity to the top frame and the bottom a similar rigidity to the bottom frame. If it is found necessary a door 35 may be cut in one or both side walls and the doors or be provided with hinges 36 and latches 37. It is preferred however whenever possible that no side door be used.

At the rear end of the body, vertically disposed angles 38 are welded to the channels 11 and are carried up and similarly welded to the top frame, and a similar cross angle 39 is also provided at the top, these angles being also welded respectively to the sides and top. Hinges 40 are secured to the vertical angle irons 38 and to doors 41 which preferably form the entire back end of the trailer.

In Fig. 5, a modification of this structure is shown in which a wooden floor 30—A is used. In such case the girders 20—A and transverse beams 24—A are shallower in order that the top of the floor shall be substantially flush with the top of the side frames 11, thus lying between the side channels and bracing the side frames laterally.

In some cases it is desired to use for the sides and top, sheets of corrugated or ribbed aluminum. In such case an angle iron 42 is welded to the side frame 11—A and the sides 17—A secured to the side frame 11—A by rivets 43 the lower edge of the sides seating solidly on the angle iron 42 which forms a closure for the ribs thereof. In such case also the upper end of the side plates is secured to the strap 33—A by rivets 44 and the roof 15—A to the angle iron 32—A by rivets 45. The angle iron 32—A and plate 33—A are then secured together by welding, forming as before a deep channel which rests on and embraces the top of the sides, with the roof as before overlying the structure.

In such case the ends of each roof rib or corrugation are closed by closely fitting plugs 46 which are preferably of wood. In Fig. 9, these plugs are shown, in order to identify them, as extending slightly beyond the ends of these corrugations or ribs but they are ordinarily driven in flush or are cut off flush instead.

It will be especially noted that the side walls curve with the top and bottom frames at the front end of the trailer and extend continuously therearound with such frames forming a powerful and extremely rigid cross bracing for that end of the trailer. It will also be noted, that the side walls form the entire bracing which gives longitudinal strength and rigidity and that securing the parts together by continuous welding the entire structure is virtually made of a single piece of metal.

On Figs. 14 and 15, the bottom frame is shown with side channels 11—A which are straight instead of arched at the wheels and are not stepped up in front. Obviously, such construction is much simpler.

In Figs. 11 to 15 inclusive, the various steps employed in the construction of a body are indicated. These steps being equally applicable either to the flat type of floor frame or to the arched type, and in order to illustrate this, the arched type is shown in dotted lines in Fig. 14.

In constructing the body, a continuous channel of suitable size is bent into U shape outlining the length and width of the body, this channel being indicated by the numeral 11—A in Fig. 12. If the arched and stepped type of frame is to be used, a channel suitably stepped and arched is similarly laid out, the plan outlined in either case being identical.

The intermediate beams 20, are assembled between the side channels parallel thereto, and suitably spaced therefrom. A transverse channel 50 is placed across the ends of the beams 20, extending from side channel to side channel, and is welded securely to all of these. Preferably, the side channels and the end channel are mitered and welded along the mitered joints. The front ends of the beams 20, are securely welded to the curved forward end of the outer channel. Both top and bottom flanges of these beams are cut away at the junction of the beams with the channels in order that the webs of the beams may be welded to the channel webs and flanges. The transverse channels 21, suitably spaced are placed across and welded to the under side of the side channel. The cantilever beams 24 and 25, are fitted between the intermediate beams 20, and between these beams are the outer channel respectively, and securely welded thereto, and the pivot plate 26 is welded in proper position beneath the frame. This accomplished a rigid under frame which for all practical purposes is one single piece of metal. The floor 30, is then cut to conform exactly to the outline of the frame, except that it is made just enough narrower and shorter to allow the siding 17, including the ribs 18, to rest fully upon the side channels 11. This being most clearly shown in detail in Fig. 8. This floor which is made up of a number of sheets is then securely welded to the under frame and the sheets continuously welded together.

The flat bar of iron 33, which is to be disposed against the inside of the side wall at the top, is then placed on edge as shown in Fig. 13, and is positioned directly along the edge of the floor so that its outer surfaces conforms exactly to the outer outline of and being bent at the forward end to the same radius as the floor. Temporary brace rods 51 are then placed across and welded to the bar 33, and one or more additional brace rods 52, are similarly welded to hold the curved front end of this bar to shape, thus forming of the bar 33 a template for the top of the sides and for the front end which conforms exactly to the bottom.

The vertical end angles 38, are then set up and securely welded at their bottom ends to the side channels 11—A and channel 50, and the cross angle 39 is securely welded to the cross angle 39, and is otherwise temporarily supported by posts 53, ordinarily of wood which are X broad. The top of the template is so placed that when the sides are erected their tops are flush with the top of the template. Thereafter, the sides 17, are placed, ordinarily beginning at the back end and erecting, first the section 17—A thereof, welding this securely at the bottom to the channels 11—A, and at the top to the bar 33. Additional sections 17—B, etc., are then successively placed and similarly welded until the erection of the sides is complete. The angle iron 32, in one continuous piece, is then placed around the top of these sides with its horizontal leg lying on top of the sides and its vertical leg against the outside of the ribs 18 thereof, to each of which ribs it is welded. It also rests on top of the bar 33, and to this also it is securely welded, thus combining the top of the sides, the bar 33, and the angle 32, into a unitary top frame. The sections 17—A and 17—B, are then continuously welded together along the seam 54 and the additional sections similarly welded to make the siding a unitary member.

The top 15, in sections similar to the section 17—A of the sides, is laid directly on the angle 32 and is welded thereto, and the joints between the various sections of the top are also continuously welded.

After this welding has been done all joints, between the sides and the bottom frame, between the various sections of the sides, between the sides and the top angle, between the top and the top angle, and between the various sections of the top are inspected by passing a light along the outside of each of the joints and examining from the inside to make sure that no unwelded places are left. The purpose of this inspection is not only to secure a water tight job but also to insure an absolute joining of all the parts into a unitary structure whereby the sides and the top form webs to reinforce and brace the heavier metal angle and bar to which they are secured at the top, and whereby the bottom and sides form a similar web to reinforce and strengthen the bottom frame.

When the arched and stepped frame is used the bar 33 is shaped to conform to the circular forward end of the frame and is extended rearwardly and allowed to rest on top of the arches 28 and in such position is braced as before.

It will be appreciated that bodies of the type here described are largely individual jobs varying enough in dimension, if not in type, to negative the use of giant presses necessary to exactly shape the various parts so that the methods here described become of importance if truly vertical lines are to be made.

Having described my invention, what I claim is:—

1. A unitary roof structure for trailers or the like for highway use, comprising a roof frame composed of a peripheral, integral member bent into substantially U-shape and a transverse member integrally connected to the respective ends of said U-shaped member; and a flat, sheet-like, transversely-ribbed roofing member rigidly secured to said frame, the horizontal top of said members being flat and of such width as to provide broad seats for the sheet-like roofing members, thereby uniting the sides and ends of the roof frame into a horizontal beam and dispensing with the use of cross-braces or the like.

2. A unitary roof structure for trailers or the like for highway use, comprising a roof frame composed of a peripheral, integral angle-iron bent into substantially U-shape, an angle-iron member connected to the respective ends of said U-shaped member, each of said angle-irons having one of its legs disposed horizontally and its other leg disposed vertically; and a flat, sheet-like, transversely-ribbed roofing member rigidly secured to the horizontal legs of said angle-irons, the upper sides of said horizontal legs being flat, and of such width as to provide broad seats for said sheet-like roofing members, thereby uniting the sides and ends of the roof frame into a horizontal beam, and dispensing with the use of cross-braces or the like.

3. A unitary sidewall and end structure for trailers or the like for highway use, comprising an upper frame composed of a peripheral, integral angle-iron bent into substantially U-shape, said angle-iron having vertically and horizontally disposed legs; a lower frame composed of a peripheral, integral, structural-iron beam bent to conform in plan to said upper angle-iron, said beam having an upper portion horizontally disposed; vertical metal posts, each integrally connected, to an upper-angle end and lower-beam end; and a sheet-like, vertically-ribbed wall-member seated on and rigidly secured to said horizontal beam-portion, said wall-member extending upward to and contacting said horizontal and vertical legs of said angle-iron, and being rigidly secured to said angle-iron, said wall-member extending continuously from one of said vertical members to the other and being rigidly secured to each thereof, whereby to constitute a vertically-disposed beam-like wall-and-end structure extending continuously along one side, around an end, and back on the other side, and whereby longitudinal and transverse bracing is accomplished by said sheet-like wall.

4. A unitary sidewall, roof and eave structure for trailer bodies or the like for highway use, comprising a roof frame having a peripheral, integral angle-iron bent into substantially U-shape, said angle-iron having a horizontally-disposed leg and a vertical leg extending downward from said horizontal leg; a flat, sheet-like, transversely-ribbed, roofing-member contacting the top surface of said angle-iron and rigidly secured thereto; and a vertically-disposed, vertically-ribbed, sheet-like wall-member coextensive with the length of said angle-iron, underlying the horizontal leg of said angle-iron and contacting the vertical leg thereof, said wall-member being rigidly secured to said angle-iron, whereby to unite said angle-iron, said roofing-member, and said wall-member into a continuous unitary, sealed structure vertically and horizontally braced by said sheet-like wall and said sheet-like roof respectively, and coextensive with an end and both contiguous sides of said trailer body.

5. A unitary sidewall-and-end structure for trailers or the like for highway use, comprising an upper frame composed of a peripheral, integral metal member bent into substantially U-shape, said member having a horizontally disposed section, a lower frame composed of a peripheral, integral, structural-iron beam bent to conform in plan to said upper member, said beam having an upper portion horizontally disposed, vertical metal posts, each integrally connected, to an upper-member end and lower-beam end; and a sheet-like, vertically-ribbed wall-member seated on and rigidly secured to said horizontal beam-portion, said wall-member extending upward to and contacting said horizontal-section, and being rigidly secured thereto, said wall-member extending continuously from one of said vertical members to the other and being rigidly secured to each thereof, whereby to constitute a vertically-disposed beam-like wall-and-end structure extending continuously along one side, around an end, and back on the other side, and whereby longitudinal and transverse bracing is accomplished by said sheet-like wall.

NATHAN A. CARTER.